United States Patent
Hignett et al.

(10) Patent No.: US 8,840,151 B2
(45) Date of Patent: Sep. 23, 2014

(54) SEAL BETWEEN PIPE SECTIONS

(75) Inventors: Ian Harold Hignett, Norfolk (GB); Katsuo Ueno, Chiba (JP)

(73) Assignee: HSC High Sealed & Coupled Pte. Ltd., Singapore (SG)

( * ) Notice: Subject to any disclaimer, the term of this patent is extended or adjusted under 35 U.S.C. 154(b) by 353 days.

(21) Appl. No.: 13/054,764

(22) PCT Filed: Dec. 13, 2010

(86) PCT No.: PCT/GB2010/002261
§ 371 (c)(1),
(2), (4) Date: Jan. 18, 2011

(87) PCT Pub. No.: WO2011/121263
PCT Pub. Date: Oct. 6, 2011

(65) Prior Publication Data
US 2012/0133129 A1    May 31, 2012

(30) Foreign Application Priority Data
Mar. 29, 2010 (GB) .................................. 1005247.0

(51) Int. Cl.
*E21B 17/08* (2006.01)
*F16L 15/00* (2006.01)
*E21B 17/042* (2006.01)

(52) U.S. Cl.
CPC .............. *F16L 15/00* (2013.01); *E21B 17/042* (2013.01)
USPC ....................................................... 285/333

(58) Field of Classification Search
USPC ....................... 285/333, 334, 334.4
See application file for complete search history.

(56) References Cited

U.S. PATENT DOCUMENTS

| 3,856,337 A |   | 12/1974 | Ehm et al. |
| 4,009,893 A | * | 3/1977  | Schatton et al. ............... 285/110 |
| 4,611,838 A | * | 9/1986  | Heilmann et al. ............ 285/331 |
| 4,624,488 A | * | 11/1986 | Furgerson ..................... 285/334 |

(Continued)

FOREIGN PATENT DOCUMENTS

| CA | 2507473 A1 | 6/2004 |
| DE | 2134274 B1 | 8/1972 |

(Continued)

OTHER PUBLICATIONS

International Search Report of the International Searching Authority (EPO) issued in connection with PCT/GB2010/002261 on May 9, 2011.

*Primary Examiner* — James Hewitt
(74) *Attorney, Agent, or Firm* — Levenfeld Pearlstein, LLC

(57) ABSTRACT

A screw-threaded pipe joint comprising a pin having at one end a male screw-threaded portion and a box having at one end a female portion having a complementary screw-thread. The pin and box inter-engage along the threaded portions with the male thread extending to a male stop shoulder adjacent a complementary stop shoulder on the other portion. The complementary stop shoulder comprises a recess in the form of a cone receiver having a radial surface adjacent a corresponding radial surface on the complementary stop shoulder. A curved sealing surface on the pin sealingly engages a corresponding curved sealing surface on the complementary stop shoulder of the box, each curved sealing surface lying on the arc of the circumference of a separate circle, and wherein the curvature of the box sealing surface is greater than on the sealing surface on the pin.

16 Claims, 4 Drawing Sheets

(56) References Cited

U.S. PATENT DOCUMENTS

| | | | |
|---|---|---|---|
| 4,732,416 A | | 3/1988 | Dearden et al. |
| 4,944,538 A | | 7/1990 | Read |
| 5,137,310 A | * | 8/1992 | Noel et al. .................... 285/333 |
| 6,045,165 A | * | 4/2000 | Sugino et al. ................ 285/333 |
| 6,045,310 A | * | 4/2000 | Miller et al. .................. 411/383 |
| 2004/0084901 A1 | | 5/2004 | Church |
| 2005/0073147 A1 | * | 4/2005 | Hignett ........................ 285/333 |
| 2005/0248153 A1 | * | 11/2005 | Sugino et al. ................ 285/333 |
| 2006/0157982 A1 | * | 7/2006 | Hignett ........................ 285/333 |

FOREIGN PATENT DOCUMENTS

| | | |
|---|---|---|
| DE | 8707965 U1 | 7/1987 |
| DE | 19955377 A1 | 6/2001 |
| EP | 0254552 A1 | 1/1988 |
| GB | 2479259 A | 10/2011 |
| JP | 08135855 A | 5/1996 |
| JP | 09152067 A | 6/1997 |
| JP | 10148281 A | 6/1998 |
| WO | 03048623 A1 | 6/2003 |
| WO | 2010047406 A1 | 4/2010 |

* cited by examiner

SEAL BETWEEN PIPE SECTIONS

CROSS-REFERENCE TO RELATED APPLICATIONS

This is a National Stage Application of International Patent Application No. PCT/GB2010/002261, filed Dec. 13, 2010, which claims the benefit of and priority to United Kingdom patent application Ser. No. GB1005247.0, filed Mar. 29, 2010, the contents of each of which are incorporated fully by reference herein.

FIELD OF THE INVENTION

The present invention relates to an improved seal between two pipe sections. The pipe sections particularly contemplated find application in the oil and gas drilling industries.

BACKGROUND TO THE INVENTION

The production of steel pipes for use in the oil and gas drilling industries has been the subject of a large amount of research and innovation. Apart from the materials and the means of forming a cylindrical tube, one aspect which has been a focus of attention is the coupling together of two separate pipes to provide a fluid-tight joint capable of withstanding both tensive and compressive forces.

The joints are normally formed by screwing together two pipes, each having complementary threads pre-cut into the ends of each of the pipes: addition of further pipes to the free end continuing, to build up a string. As an alternative but related method, a threaded coupling-sleeve is used to bridge across the ends of two pipes, but the principle remains the same.

To improve the sealing properties of the joint produced between pipes, and to give a seal capable of withstanding repeated handling under normal operating conditions, the profile and surface of the threaded part of the end of the pipes and the regions immediately around the threaded part towards the end of the pipe, are specifically designed to co-operate together to provide the seal. Typically the end of the pipe has a threaded portion cut either onto the outside of the pipe (to form a pin or male section) or into the inner surface of the pipe (to form a box or female section). The surface onto which the threaded portion is introduced can include a taper to assist the coupling process.

Alternatively the diameter of the pipe in the seal forming region can have been increased in comparison to that predominating along the length of the pipe, usually by cold forming, to allow a joint to be formed.

On the pipe, an unthreaded section is normally left between the end of the pipe and the threaded section, which unthreaded section is often referred to as a stop-shoulder. Particular emphasis has been placed in research on the stop-shoulder as this often constitutes the primary sealing region of the pipe joint. The stop-shoulder on the pin is usually profiled to engage a corresponding recess on the box section to form a strong seal. The particular profile is normally chosen to disperse efficiently the strain experienced in the pipe when torque is applied to form the joint and to retain the seal when the joint is in use. In addition to the profiling, coatings can also be applied to improve the fluid-tight nature of the seals.

However, as many reserves of oil and gas begin to run out and the price of oil climbs there is an increasing requirement and opportunity to extract oil and gas from reserves which would have hitherto been uneconomic. For example, extraction needs to take place from deeper or more inaccessible levels. Moreover, there is also a desire where possible to use existing bore-holes as a starting point to reach the more difficult deposits.

The outcome of this is that pipe joints need to be able to withstand high temperatures and pressures—both tensive and compressive—than has previously been the case. For example, many strings need to have bends of around 90° when going from a vertical orientation to a horizontal one. Such a bend obviously causes both compressive and tensive forces to act on the same joint.

One problem encountered on prior art joints is bending of the end of the pin on make-up of the joint. This can lead to galling: if not on the first time the joint is made up, then on subsequent make-ups. Although this problem can be addressed by increasing the tolerance on manufacture, this is an expensive solution and moreover does not completely remove the difficulties, particularly under normal working conditions.

It is an object of the present invention to seek to address the above problems.

SUMMARY OF THE INVENTION

According to a first aspect of the invention there is provided a pipe joint, the joint comprising:

a screw-threaded joint for pipes comprising a first pipe length or pin having at one end a male screw-threaded portion and a second pipe length or box having at one end a female portion having a complementary screw-thread, the portions being adapted to inter-engage along the greater part of the axial length of the threaded portions the screw threads thereof being inclined in the same direction and at an acute angle to the longitudinal axis of the pipe length, the male thread extending to a male stop shoulder adjacent a complementary stop shoulder on the other portion, the complementary stop shoulder comprising a recess in the form of a cone receiver having a rounded apex, the stop shoulder on the pin including a torque shoulder, frictionally engaging a corresponding shoulder in the complementary stop shoulder, a radial surface adjacent a corresponding radial surface on the complementary stop shoulder, a curved sealing surface on the pin sealingly engaging a corresponding curved sealing surface on the complementary stop shoulder of the box, the curved sealing surfaces being so shaped each to lie on the arc of the circumference of a separate circle, and wherein the curvature of the box sealing surface is greater than on the pin.

The above arrangement enables movement of the seal along the curved surface to take place when stresses are applied to the joint.

Preferably, the centre of the circle on which the sealing surface of the pin section lies, has its centre on a line which is 0.30-0.40" (0.762-1.016 cm) from the intersection point of lines extending from the torque shoulder and the radial surface on the pin.

Advantageously, the radius of the circle on which the sealing surface of the pin section is described is from 0.25-0.35" (0.635-0.890 cm).

Preferably the angle between the line on which the centre of the circle describing the sealing surface of the pin, and the line from the centre of the circle and the initial contact point of the two sealing surfaces is from 7.0-9.0°.

Preferably the angle between the line on which the centre of the circle describing the sealing surface of the box, and the line from the centre of the circle and the initial contact point of the two sealing surfaces is from 10.0-12.0°.

BRIEF DESCRIPTION OF THE DRAWINGS

The invention will be now described with reference to the accompanying drawings which show one embodiment of a joint. In the drawings.

DETAILED DESCRIPTION OF THE INVENTION

In designing the sealing region of a joint between the pin and box sections of steel pipes, a large number of features have been utilised and varied to try and achieve the objectives set for a particular seal. The present invention is concerned with the use of what is often referred to as a radius, on both the pin on the box section, said radii engaging each other on make-up of the joint and allowing some movement of the pin and the box relative to each other, said movement still however maintaining a seal. The seal can also be maintained when the longitudinal axes of the pin and the box sections are not in complete alignment, provided said misalignment is not too great. In a cross-section along the longitudinal axis of a pipe, the radii appear as curved lines and are so shown in the attached figures.

Although such radii are known in the prior art it has been surprisingly found that the use of two radii—one on the pin section and one on the box section—co-operate together to provide a seal which is stable under both tensive and compressive forces and also at elevated temperatures. The seal produced is therefore suitable for use in difficult environments such as those at greater depths, where high curvature of a string is required, where there is a large pressure differential between the internal volume of the pipe and the outside and where temperatures can reach more than 200 C.

It has been found firstly that the two radii preferably have different curvatures to each other. Secondly, each curved surface can be defined as being part of the arc of a circle whose centre is in the main body of the pipe. It has again been found that results are improved for those situations where on contact between the surfaces, the centre of those circles are offset longitudinally from each other and from the point of contact. In this case the centre of the circle for the curved surface of the box section lies in the longitudinal direction of the bulk of the pipe of which the box section is a part. Similarly the centre of the circle for the curved surface on the pin section lies longitudinally to the opposite side of the point of contact.

Figure 2:
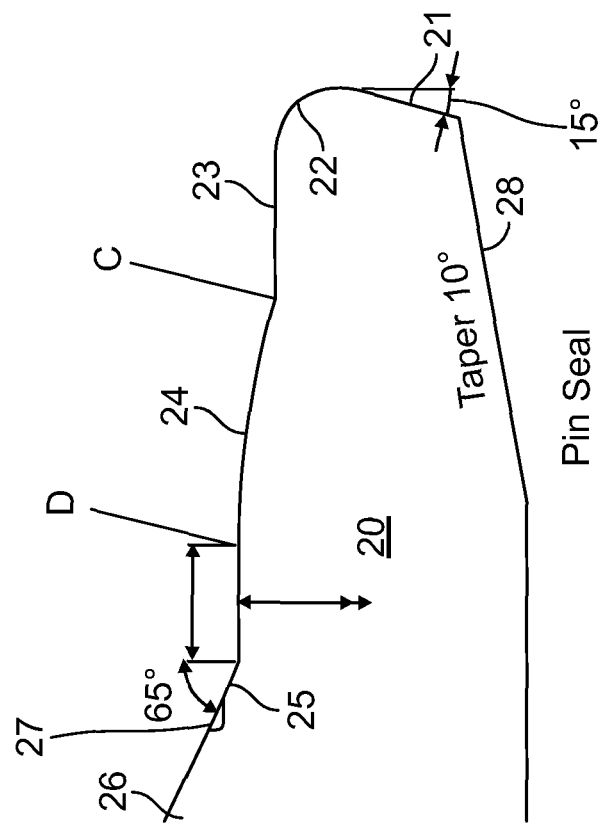
FIG. 2 is a section of the longitudinal axis of a pipe section, showing the sealing region of a pin seal.
Figure 1:
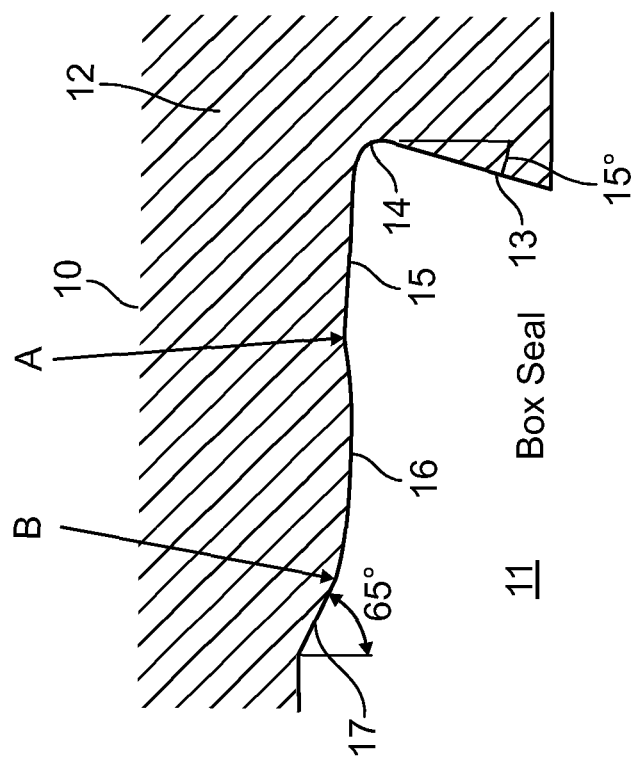
FIG. 1 is a section of the longitudinal axis of a pipe section, showing the sealing region of a box seal.

The invention is now illustrated initially with respect to FIGS. 1 and 2 which show the stop shoulder recess of a box section and the stop shoulder of a pin section of a pipe respectively.

Dealing firstly with the box section 10 of a pipe, this comprises a recess 11 defined by the metal from which the bulk 12 of the pipe is formed. The pipe body itself is shown in hatched shading to visually assist the interpretation of the features. The recess 11 has a torque shoulder 13 which in use engages a corresponding surface on the pin on make-up of the joint. Although this engagement is defined in many prior art documents to be a sealing engagement, this is not necessary or desirable in the present invention. As can be seen from FIG. 1, the torque shoulder 13 defines an angle of 15° with respect to the plane perpendicular to the longitudinal axis of the pipe. It will be recognised by the skilled person that this angle can be varied within limits, without detracting from the performance of the main seal. A curved surface 14 of radius 0.02" (0.0508 cm) joins the torque shoulder 13 to a further tapered surface 15. The surface 15, in three dimensions is conical, but in the cross-sectional representation of FIG. 1 appears as a straight line. The surface 15 is at an angle of 7.12° ($\tan^{-1}$ (⅛)) to the longitudinal axis of the pipe.

At point A, the cross-sectional profile of the box 10 becomes curved between point A and point B. Along this section the curved surface 16, between A and B, describes the arc of the circumference of a circle whose centre lies in the bulk material of the pipe 10. The radius of the circle in the exemplified figure is 0.6 cm.

Beyond the point B, a further conical surface 17 at an angle of 65° to the plane perpendicular to the longitudinal axis of the pipe 10, joins the curved surface 16 to the final crest of the threaded portion of the pipe 10.

The pin 20, has a configuration which is in some aspects complementary to that of the recess 11 in the box 10. The pin 20 has a torque shoulder 21 at an angle of 15° to the plane perpendicular to the longitudinal axis of the pin 20. The torque shoulder 21 is joined by a curved surface 22 of radius 0.0415" (0.1054 cm) to a conical surface 23 which has 0° taper with respect to the longitudinal axis of the pin 20.

At point C, the cross-sectional profile of the pin 20 becomes curved between points C and D, with the curved surface 24 lying on the arc of the circumference of a circle of radius 0.6 cm. Beyond point D, a further conical surface 25 links the curved surface 24 to the final crest of the threaded portion 26 of the pin 20. The notch 27 shown in FIG. 2 is simply the base of the thread portion 26.

Figure 3:
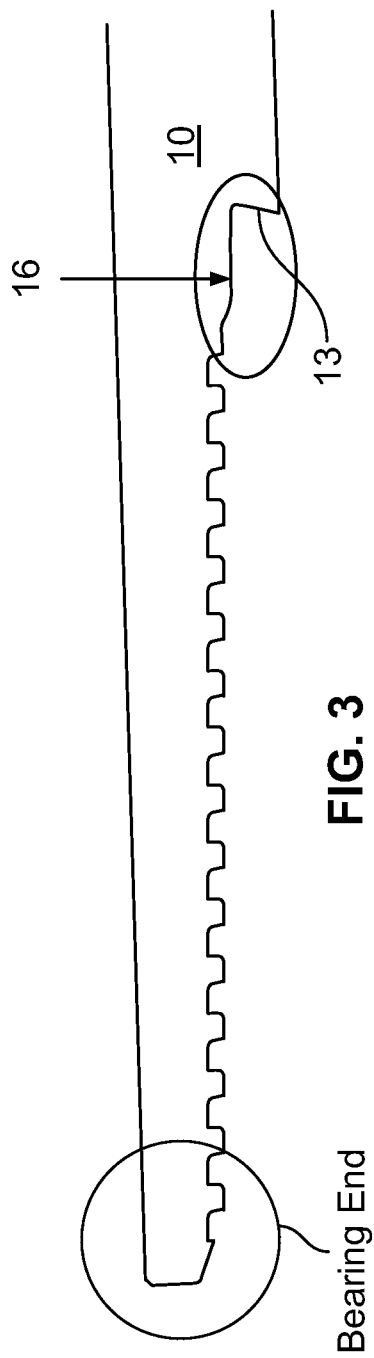
FIG. 3 illustrates the location within a pipe section of the box seal in FIG. 1.
Figure 4:
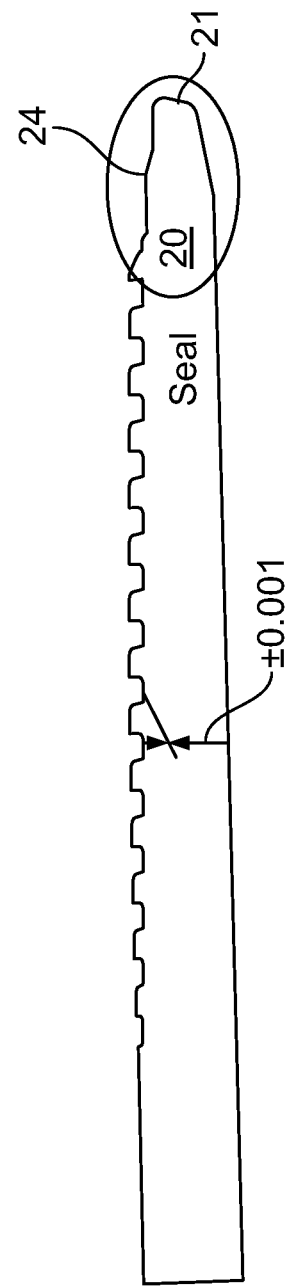
FIG. 4 illustrates the location within a pipe section of the pin seal in FIG. 2.

The pin 20 has a chamfered surface 28, said chamfered surface 28 having a straight cross-section as shown and at an angle of 10° to the longitudinal axis of the pin 20. It will be appreciated by the skilled person that said surface 28 can also be concave (when viewed from the internal volume of the pin), without departing from the scope of the invention. The relationship of the portions of the pin and box shown in FIGS. 1 and 2 to the rest of the respective pipe are shown in ellipses in FIGS. 3 and 4.

Figure 5:
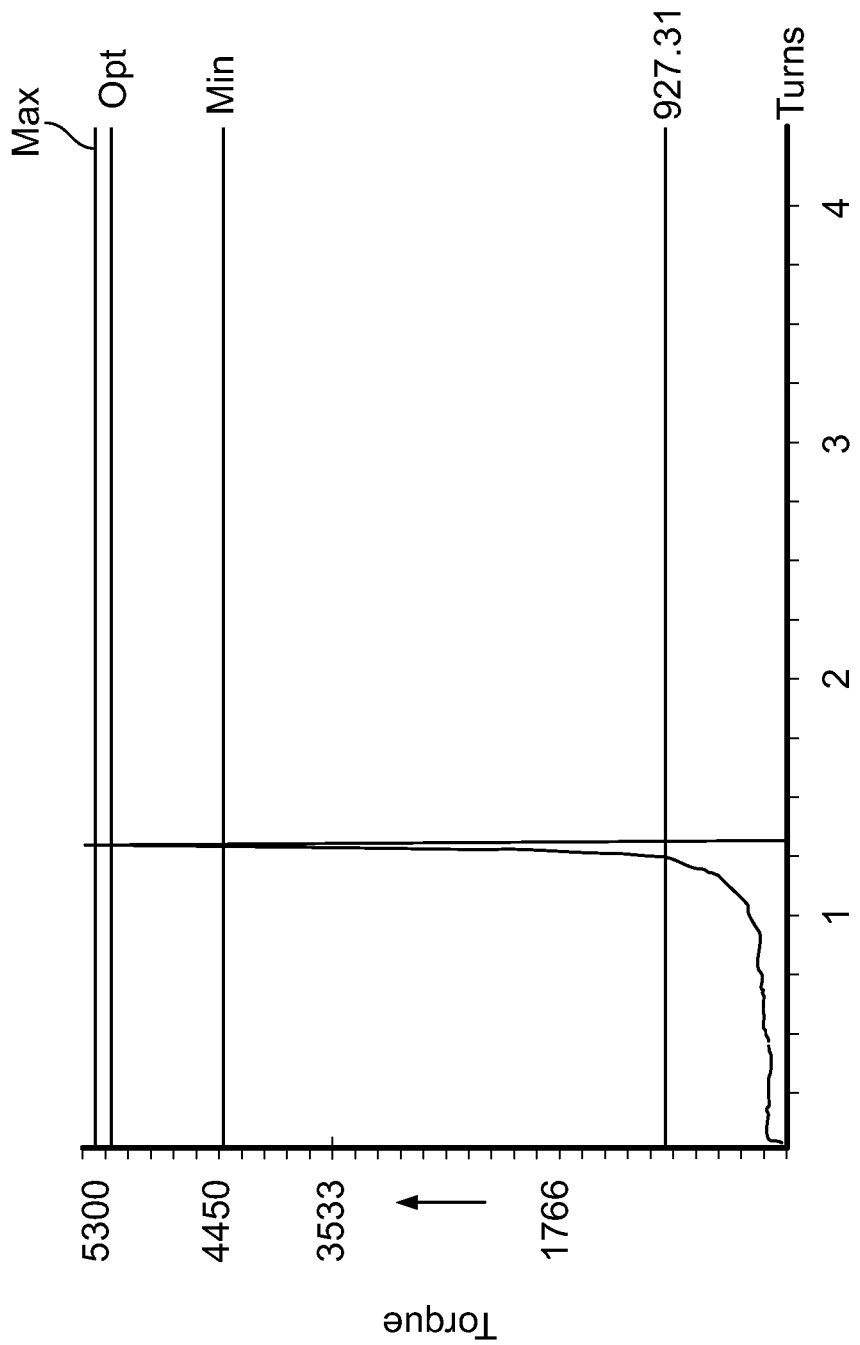
FIG. 5 illustrates a torque graph obtained during make-up of a joint.

In use therefore, on make-up of the joint, the pin and box section are brought together through engagement of the threaded sections of the pin and the box, by the application of a torque. Torque is applied until a seal is formed between the two sections. This situation is usually recognised by monitoring the magnitude of torque applied and a typical graph is shown in FIG. 5. At the point of engagement of the torque shoulders 13, 21 and formation of the seal, the torque rises discontinuously from a formerly steadily rising value. The primary seal is formed between the two curved surfaces 16, 24.

The advantage of using two curved surfaces to provide a seal which is capable of maintaining integrity under tensive or compressive forces, including bending of the joint can now be seen. If such forces act, the curved surfaces 'roll' against each other, and although the sealing point may move, its integrity remains intact. In addition, it is recognised that the end of the pin has a tendency, due to the forces exerted thereon to bend inwardly. If this process goes too far then the deformation can become so acute that on subsequent make-ups, galling can occur as the end of the pin cuts into the box section.

Figure 7:
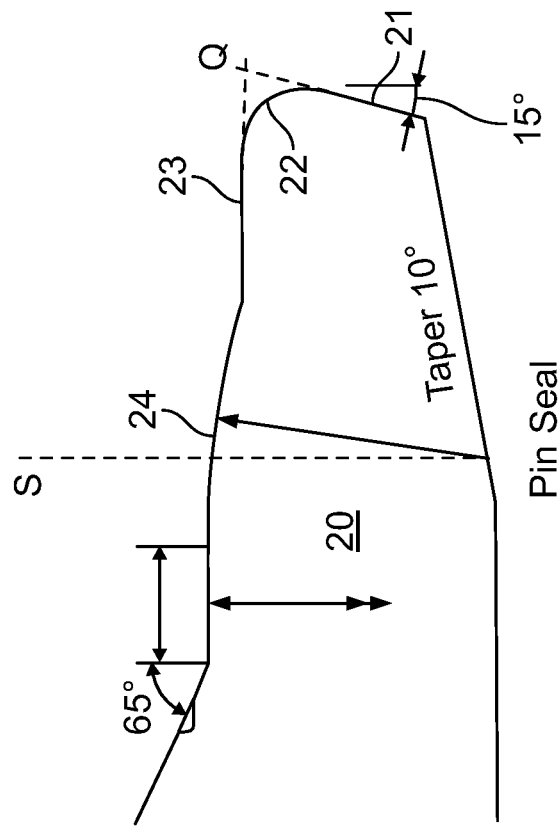
FIGS. 6 and 7 illustrate datum points and line used to determine the position of a radius sealing surface.
Figure 6:
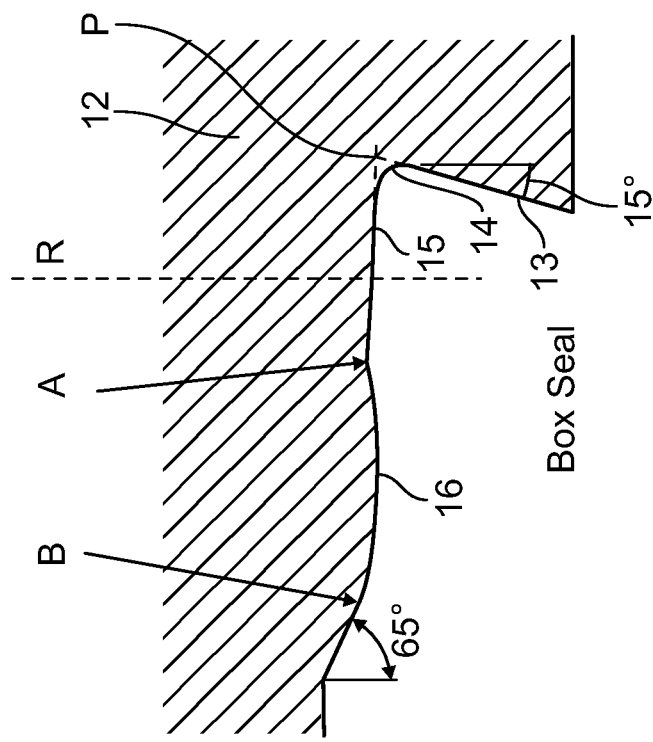

A further feature of the invention relates to the positioning and aspect of the curved sealing surfaces on the pin and the box. This is illustrated in FIGS. 6 and 7. Dealing firstly with the curved surface 16 on the box in FIG. 6, the location of the centre of the circle on whose circumference the circle lies is defined with respect to an imaginary point P within the bulk metal of the box 10. The point P is obtained as the intersection of a line drawn extending the torque shoulder 13 and a line drawn extending the flat section 15 (the extensions being shown as broken lines in FIG. 6). Once this point is obtained, the centre of the circle then lies on the line R, perpendicular to the axis of the box which has a minimum distance of 0.2" (0.508 cm) from the intersection point P, in the direction of the threaded portion. This, line R is shown dotted in FIG. 6. The radial location of the centre of the circle on this line is governed by the circumference of the circle drawn therefrom to ensure that the curve meets the surface 17 smoothly at B; i.e. the surface is tangential to the circle at that meeting point. It has been found that the value of the minimum distance of R from P can be from 0.15"-0.25" (0.380-0.635 cm). For example for a 4½" (11.43 cm) box section a distance of 0.193" (0.4902 cm) has been found to be suitable and for a 7" (17.78 cm) box section, 0.2002" (0.5085 cm).

The location of the centre of the circle which is used in respect of the curved surface 24 on the pin 20, is similarly defined. Firstly an imaginary point Q, the intersection of a line drawn extending the torque shoulder 21 and a line drawn extending the flat section 23 is found. The centre of the circle then lies on the line S perpendicular to the axis of the box which has a minimum distance of 0.35" (0.889 cm) from the intersection point Q in the direction from Q towards the threaded portion. It has been found that the value of the minimum distance of S from Q can be from 0.30"-0.40" (0.7620-1.016 cm). For example for a 4½" (11.43 cm) pin section a distance of 0.33" (0.8382 cm) has been found to be suitable and for a 7" (17.78 cm) pin section, 0.3298" (0.8377 cm).

The radii of the circles formed need to be carefully chosen to ensure good seal integrity and also that the seal remains intact under the forces acting thereon. A further feature which is important is the angle made between the lines joining the initial seal contact point, and the centre of a circle, and the line perpendicular to the longitudinal axis of the pipe on which the centre of the circle lies.

The curvature of the sealing surface on the pin is preferably less than that of the corresponding surface on the box. For the pin a suitable radius is selected to be in the range of 0.25"- 0.35" (0.63-0.89 cm) and the above-defined angle to be from 7-9°. In respect of the box, the radius selected is from 0.05- 0.07" (0.12-0.18 cm) and the angle from 10-12°. It will be appreciated therefore that the radii of the circles are set on the pin and box to be different to each other.

It will of course be understood that the invention is not limited to the specific details described herein, which are given by way of example only, and that various modifications and alterations are possible within the scope of the invention.

The invention claimed is:

1. A pipe joint, the pipe joint comprising:
 a first pipe, the first pipe comprising a pin, wherein the pin comprises a male screw-threaded portion having male screw threads;
 a second pipe, the second pipe comprising a box, wherein the box comprises a female screw-threaded portion having female screw threads, the female screw-threaded portion of the box configured to complementarily engage the male screw-threaded portion of the pin, wherein the male screw-threaded portion of the pin and the female screw-threaded portion of the box are configured to engage one another along at least half of an axial length of the male screw-threaded portion and the female screw-threaded portion, wherein the male screw threads and the female screw threads are inclined in the same direction and at an acute angle to a longitudinal axis of the first pipe and the second pipe, wherein the male screw threads of the male screw-threaded portion extend to a male stop shoulder adjacent to a complementary female stop shoulder on the female screw-threaded portion, the female stop shoulder comprising a recess formed as a cone receiver having a rounded apex, and wherein the male stop shoulder comprises a male torque shoulder, the male torque shoulder frictionally engaging a corresponding female torque shoulder formed in the female stop shoulder;
 a pin radial surface on the male stop shoulder, disposed between the male torque shoulder and male screw-threaded portion, on the pin, adjacent a corresponding box radial surface on the female stop shoulder, disposed between the female torque shoulder and the female screw-threaded portion, on the box; and
 a pin curved sealing surface, disposed between the pin radial surface and the male screw-threaded portion, on the pin, facing outwardly away from the longitudinal axis, sealingly engaged with a corresponding box curved sealing surface, disposed between the box radial surface and the female screw-threaded portion, on the box, facing outwardly towards the longitudinal axis, the pin curved sealing surface having a first curvature and the box curved sealing surface having a second curvature, wherein the pin curved sealing surface and the box curved sealing surface each are shaped to lie on respective arcs of circumferences of separate circles, and wherein the second curvature of the box curved sealing surface is greater than the first curvature of the pin curved sealing surface.

2. The pipe joint of claim 1, wherein a center of the circle on which the pin curved sealing surface lies is disposed on a first line perpendicular to the longitudinal axis of the first pipe and the second pipe, the first line being from about 0.30" to about 0.40" (about 0.762 cm to about 1.016 cm) from an intersection point of a second line extending from the male torque shoulder and a third line extending from the pin radial surface.

3. The pipe joint of claim 1, wherein a radius of the circle on which the pin curved sealing surface lies is from about 0.25" to about 0.35" (about 0.635 cm to about 0.890 cm).

4. The pipe joint of claim 2, wherein a radius of the circle on which the pin curved sealing surface lies is from about 0.25" to about 0.35" (about 0.635 cm to about 0.890 cm).

5. The pipe joint of claim 1, wherein an angle between a first line on which a center of the circle on which the pin curved sealing surface lies and a second line extending from the center of the circle on which the pin curved sealing surface lies to an initial contact point of the pin curved sealing surface and the box curved sealing surface is from about 7.0° to about 9.0°.

6. The pipe joint of claim 2, wherein an angle between the first line and a fourth line extending from the center of the circle on which the pin curved surface lies to an initial contact point of the pin curved sealing surface and the box curved sealing surface is from about 7.0° to about 9.0°.

7. The pipe joint of claim 3, wherein a first line on which a center of the circle on which the pin curved sealing surface lies and a second line extending from the center of the circle on which the pin curved sealing surface lies to an initial contact point of the pin curved sealing surface and the box curved sealing surface is from about 7.0° to about 9.0°.

8. The pipe joint of claim 4, wherein an angle between the first line and a fourth line extending from the center of the circle on which the pin curved surface lies to an initial contact point of the pin curved sealing surface and the box curved sealing surface is from about 7.0° to about 9.0°.

9. The pipe joint of claim 1, wherein an angle between a first line on which a center of the circle on which the box curved sealing surface lies and a second line extending from the center of the circle on which the box curved sealing surface lies to an initial contact point of the pin curved sealing surface and the box curved sealing surface is from about 10.0° to about 12.0°.

10. The pipe joint of claim 2, wherein an angle between a fourth line on which a center of the circle on which the box curved sealing surface lies and a fifth line extending from the center of the circle on which the box curved sealing surface lies to an initial contact point of the pin curved sealing surface and the box curved sealing surface is from about 10.0° to about 12.0°.

11. The pipe joint of claim 3, wherein a first line on which a center of the circle on which the box curved sealing surface lies and a second line extending from the center of the circle on which the box curved sealing surface lies to an initial contact point of the pin curved sealing surface and the box curved sealing surface is from about 10.0° to about 12.0°.

12. The pipe joint of claim 4, wherein an angle between a fourth line on which a center of the circle on which the box curved sealing surface lies and a fifth line extending from the center of the circle on which the box curved sealing surface lies to an initial contact point of the pin curved sealing surface and the box curved sealing surface is from about 10.0° to about 12.0°.

13. The pipe joint of claim 5, wherein an angle between a third line on which a center of the circle on which the box curved sealing surface lies and a fourth line extending from the center of the circle on which the box curved sealing surface lies to the initial contact point of the pin curved sealing surface and the box curved sealing surface is from about 10.0° to about 12.0°.

14. The pipe joint of claim 6, wherein an angle between a fifth line on which a center of the circle on which the box curved sealing surface lies and a sixth line extending from the center of the circle on which the box curved sealing surface lies to the initial contact point of the pin curved sealing surface and the box curved sealing surface is from about 10.0° to about 12.0°.

15. The pipe joint of claim 7, wherein an angle between a third line on which a center of the circle on which the box curved sealing surface lies and a fourth line extending from the center of the circle on which the box curved sealing surface lies to the initial contact point of the pin curved sealing surface and the box curved sealing surface is from about 10.0° to about 12.0°.

16. The pipe joint of claim 8, wherein an angle between a fifth line on which a center of the circle on which the box curved sealing surface lies and a sixth line extending from the center of the circle on which the box curved sealing surface lies to the initial contact point of the pin curved sealing surface and the box curved sealing surface is from about 10.0° to about 12.0°.

* * * * *

UNITED STATES PATENT AND TRADEMARK OFFICE
CERTIFICATE OF CORRECTION

PATENT NO.        : 8,840,151 B2
APPLICATION NO.   : 13/054764
DATED             : September 23, 2014
INVENTOR(S)       : Hignett et al.

Page 1 of 1

It is certified that error appears in the above-identified patent and that said Letters Patent is hereby corrected as shown below:

In the Specification,

Column 5, line 16, "This," to read as --This--.

Signed and Sealed this
Fourteenth Day of April, 2015

Michelle K. Lee
*Director of the United States Patent and Trademark Office*